United States Patent
Kolouch

(10) Patent No.: US 6,312,814 B1
(45) Date of Patent: Nov. 6, 2001

(54) FLUOROPOLYMER LAMINATE

(75) Inventor: Robert Joseph Kolouch, Vienna, WV (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/114,451

(22) Filed: Jul. 13, 1998

Related U.S. Application Data

(60) Provisional application No. 60/058,227, filed on Sep. 9, 1997.

(51) Int. Cl.[7] .......................... B32B 15/08; B32B 27/18; B32B 27/28; B32B 27/30; B32B 15/04

(52) U.S. Cl. .......................... 428/421; 428/422; 428/461; 428/463; 525/199; 525/200; 526/242; 526/243; 526/248

(58) Field of Search .................... 428/421, 422, 428/457, 461, 663; 526/243, 248, 242; 525/199, 200

(56) References Cited

U.S. PATENT DOCUMENTS

| | | | |
|---|---|---|---|
| 5,093,403 | 3/1992 | Rau et al. | 524/404 |
| 5,230,961 | 7/1993 | Tannenbaum | 428/422 |
| 5,587,413 | 12/1996 | Enokida et al. | 524/200 |
| 5,670,593 | 9/1997 | Araki et al. | 526/245 |
| 5,780,552 * | 7/1998 | Kerbow | 525/276 |
| 5,866,711 * | 2/1999 | Hung et al. | 560/167 |

FOREIGN PATENT DOCUMENTS

| | | | |
|---|---|---|---|
| 0 626 424 A1 | 11/1994 | (EP) | C08L/27/12 |
| 0 709 428 A1 | 5/1996 | (EP) | C08L/27/12 |
| 0 728 776 A1 | 8/1996 | (EP) | C08F/214/18 |
| 0 761 757 A1 | 3/1997 | (EP) | C08L/51/00 |

* cited by examiner

*Primary Examiner*—Vivian Chen

(57) ABSTRACT

Fluoropolymer compositions containing melt-fabricable functionalized fluoropolymer and high temperature resistant thermoplastic form laminates to metal at low concentrations of high temperature resistant thermoplastic.

10 Claims, No Drawings

FLUOROPOLYMER LAMINATE

RELATED APPLICATION

This application claims the benefit of Provisional Application No. 60/058,227 filed Sep. 9, 1997.

FIELD OF THE INVENTION

This invention is in the field of melt-fabricable fluoropolymers, and is specifically concerned with laminates of melt-fabricable fluoropolymer compositions and metal.

BACKGROUND OF THE INVENTION

Fluoropolymer resins, and especially perfluoropolymer resins, are known for their low surface energy and antistick properties, and thermal and chemical resistance. These copolymers do not stick to other materials, especially dissimilar materials, with any practical degree of bond strength.

Some high temperature resistant thermoplastics (HTRP), such as polyamide imide, polyarylene sulfide and polyether sulfone, have found use as adhesion promoters in fluoropolymer coating formulations. See, for example U.S. Pat. No. 5,230,961 (Tannenbaum) and U.S. Pat. No. 5,093,403 (Rau et al). However, such adhesion promoters are typically used in relatively high proportions which can detract from the properties of the fluoropolymer. For example, U.S. Pat. No. 5,230,961 claims (claim 7) a coated substrate wherein the primer contains 15–30% of polyamide imide and 25–55% of perfluoropolymer, and TABLE 14 of U.S. Pat. No. 5,093,403 gives primer formulations containing 15–20 wt % of polyphenylene sulfide or polyetheretherketone.

There remains a need for laminates of melt-flowable fluoropolymer to dissimilar materials, notably metals, in which the fluoropolymer component has good adhesion to the metal at high fluoropolymer content, so that the fluoropolymer component of the laminate substantially retains the thermal and chemical resistance of fluoropolymer.

SUMMARY OF THE INVENTION

This invention provides a laminate of metal and melt-fabricable fluoropolymer composition adhered thereto, said composition comprising functionalized fluoropolymer resin and high temperature resistant thermoplastic resin adhesion promoter. Preferably, the composition contains minor portions of functionalized fluoropolymer and high temperature resistant thermoplastic resin adhesion promoter, and a major portion of non-functional fluoropolymer. The composition exhibits synergistic enhanced adhesion to metal, so that a laminate having good adhesion between components is obtained with a fluoropolymer composition having a relatively low concentration of high temperature resistant thermoplastic (adhesion promoter) and, thus, predominantly fluoropolymer character.

DETAILED DESCRIPTION

It has been discovered that a combination of functionalized fluoropolymer and high temperature resistant thermoplastic (HTRP) results in a synergistic increase in the adhesion of the composition to metal. When both components are present, the adhesion result is better than would be predicted from adhesion results when only one of these components is present. In one aspect, notably, the presence of the functionalized fluoropolymer enhances rather than interferes with the adhesion promotion of the HTRP. As a result, relatively low concentrations of HTRP can be used to achieve good adhesion, so that the composition has a relatively high proportion of fluoropolymer and, therefore, predominantly fluoropolymer characteristics.

As used herein, "functionalized fluoropolymer" means fluoropolymer having functional side groups or functional groups attached to side groups. Usually, but not necessarily, such functional units are at the ends of the pendant side groups. Functional groups, in the context of the present invention, are groups capable of enhancing the effect of HTRP adhesion promoter, when functional groups and HTRP adhesion promoter are both present in a fluoropolymer composition, to achieve an adhesive bond between the fluoropolymer composition and a metal surface to form a laminate. Such functional groups can be introduced, for example, by incorporating into the fluoropolymer, during polymerization, monomer units having such functional groups, i.e., functional monomers.

Functional groups that can enhance the effect of HTRP adhesion promoter include ester, alcohol, acid (including carbon-, sulfur-, and phosphorus-based acid) and salt and halide thereof. Other functionalities include cyanate carbamate, nitrile, and the like. Specific functional groups that can be used include —$SO_2F$, —CN, —COOH and —$CH_2$—Z wherein —Z is —OH, —OCN, —O—(CO)—$NH_2$, or —OP(O)(OH)$_2$. Preferred functional groups include —$SO_2F$ and —$CH_2$—Z wherein —Z is —OH, —O(CO)—$NH_2$, or —OP(O)(OH)$_2$. The functional groups —$CH_2$—Z wherein —Z is —OH, —O—(CO)—$NH_2$, or —OP(O)(OH)$_2$ are especially preferred. As one skilled in the art will recognize, more than one type of functional group can be present. Normally, however, a single type of functional group is used.

The concentration of functional groups in the fluoropolymer resin component, i.e., in the functionalized fluoropolymer or in functionalized fluoropolymer plus non-functional fluoropolymer, if non-functional fluoropolymer is present, of the melt-fabricable fluoropolymer composition used in the laminate of this invention is effective to enhance the effect of HTRP adhesion promoter and thereby to enable good adhesion to metal even at low HTRP concentration. As will be recognized by one skilled in the art, the concentration of functional groups that is effective to enhance the effect of HTRP adhesion promoter can vary at least with the type of functional group and with the type of HTRP. The concentration of functional groups present can be expressed relative to the number of main chain carbon atoms in the fluoropolymer resin. Generally, the concentration of functional groups present is at least about $25/10^6$ main chain C atoms, based on total fluoropolymer in the composition. The concentration of functional groups is usually in the range of 25–2500 per $10^6$ main chain C atoms, preferably in the range of 50–2000 per $10^6$ main chain C atoms, based on total fluoropolymer present.

The desired concentration of functional groups in the functionalized fluoropolymer resin can be achieved with a single fluoropolymer having functional groups, or a mixture of such fluoropolymers. The desired concentration of functional groups can also be achieved by blending functionalized fluoropolymer (or mixture of) having a higher concentration of functional groups with non-functional fluoropolymer (or mixture of), i.e., fluoropolymer having essentially no functional groups. In this embodiment, functionalized fluoropolymer acts as a functional group concentrate that can be let down (diluted) with non-functional fluoropolymer. This approach has the advantage of permitting one to achieve a variety of functional group concentrations with a single functionalized fluoropolymer by varying the blending ratio with non-functional fluoropolymer, and is a preferred embodiment of the invention. Preferably, in a functionalized fluoropolymer that is a blend, the functionalized fluoropolymer component is in minor (lesser) amount relative to non-functional fluoropolymer component.

Thus, in a preferred embodiment of the present invention, the melt-fabricable fluoropolymer composition contains minor amounts of functionalized fluoropolymer and high temperature resistant thermoplastic resin, and a major amount of non-functional fluoropolymer. By "major amount" is meant at least 50 wt %, preferably at least 70 wt %, of non-functional fluoropolymer based on combined weight of non-functional fluoropolymer, functional fluoropolymer, and HTRP adhesion promoter. In this embodiment, the composition preferably contains 1–30 wt %, more preferably 1–20 wt %, most preferably 3–15 wt %, of functionalized fluoropolymer and 0.5–10 wt %, more preferably 1–5 wt %, of HTRP adhesion promoter, based on combined weight of non-functional fluoropolymer, functionalized fluoropolymer, and HTRP. In this embodiment of the invention, then, the concentration of functional groups in the functionalized fluoropolymer will be higher than recited above for total fluoropolymer according to the amount of non-functional fluoropolymer present in the blend.

Fluoropolymer resins that can be used include copolymers of TFE with one or more copolymerizable monomers chosen from perfluoroolefins having 3–8 carbon atoms and perfluoro(alkyl vinyl ethers) (PAVE) in which the linear or branched ailyl group contains 1–5 carbon atoms. Preferred perfluoropolymers include copolymers of TFE with at least one of hexafluoropropylene (HFP) and PAVE. Preferred comonomers include PAVE in which the alkyl group contains 1–3 carbon atoms, especially 2–3 carbon atoms, i.e. perfluoro(ethyl vinyl ether) (PEVE) and perfluoro(propyl vinyl ether) (PPVE). Additional fluoropolymers that can be used include copolymers of ethylene with TFE, optionally including minor amounts of one or more modifying comonomer such as perfluorobutyl ethylene. Representative fluoropolymers are described, for example, in ASTM Standard Specifications D-2116, D-3159, and D-3307. Such fluoropolymers are non-functional fluoropolymers if they have essentially no functional groups, but are functionalized fluoropolymers if functional groups are added, e.g., by grafting or by copolymerization. Preferred fluoropolymers are perfluoropolymers, except for functional units or groups. Alternatively or additionally, preferred fluoropolymers are non-elastomeric, as opposed to elastomeric.

Functionalized fluoropolymers include fluoropolymers such as those described in the foregoing paragraph and additonally containing copolymerized units derived from functional monomers. If the concentration of functional monomer is high enough in a TFE copolymer, however, no other comonomer may be needed. See, e.g., Example 18 below. Usually, but not necessarily, the functional groups introduced by such monomers are at the ends of pendant side groups. Functional monomers that introduce pendant side groups having such functionality can have the general formula $CY_2=CY-Z$ wherein Y is H or F and Z contains a functional group. Preferably, Y is F and —Z is —$R_f$—X, wherein $R_f$ is a fluorinated diradical and X is a functional group that may contain $CH_2$ groups. Preferably, $R_f$ is linear or branched perfluoroalkoxy having 2–20 carbon atoms, so that the functional comonomer is a fluorinated vinyl ether. Examples of such fluorovinylethers include $CF_2=CF[OCF_2CF(CF_3)]_m—O—(CF_2)_nCH_2OH$ as disclosed in U.S. Pat. No. 4,982,009 and the alcoholic ester $CF_2=CF[OCF_2CF(CF_3)]_m—O—(CF_2)_{n—(CH2)_p}—O—COR$ as disclosed in U.S. Pat. No. 5,310,838. Additional fluorovinylethers include $CF_2=CF[OCF_2CF(CF_3)]_mO(CF_2)_n$ COOH and its carboxylic ester $CF_2=CF[OCF_2CF(CF_3)]_m O(CF_2)_nCOOR$ disclosed in U.S. Pat. No. 4,138,426. In these formulae, m=0–3, n=1–4, p=1–2 and R is methyl or ethyl. Preferred such fluorovinylethers include $CF_2=CF—O—CF_2CF_2—SO_2F$; $CF_2=CF[OCF_2CF(CF_3)]O(CF_2)_2—Y$ wherein —Y is —$SO_2F$ or —CN; and $CF_2=CF[OCF_2CF(CF_3)]O(CF_2)_2—CH_2—Z$ wherein —Z is —OH, —OCN, —O—(CO)—$NH_2$, or —OP(O)(OH)$_2$. These fluorovinylethers are preferred because of their ability to incorporate into the polymer and their ability to incorporate functionality into the resultant copolymer.

Compounds having the formula $CF_2=CF—R_f—(CH_2)_n—X$ in which X is —OCN (cyanate), —O—(CO)—$NH_2$ (carbamate), or —OP(O)(OH)$_2$ (phosphono) can be synthesized as follows. The cyanate can be prepared in high yield by a one-step process in which known compounds having the general formula $CF_2=CF—R_f—(CH_2)_n—OH$ (I), wherein n is 1–3 and $R_f$ is perfluorolkyl or perfluoroalkoxy containing 1–20 carbon atoms, are reacted with cyanogen bromide (CNBr) or cyanogen chloride (CNCl) in the presence of non-nucleophilic base. The carbamate can be prepared from the cyanate by contacting cyanate with acid at elevated temperature for time sufficient to complete conversion of cyanate to carbamate. The phosphorus-containing compounds can be prepared in high yield by a process in which compounds (I) are reacted with P(O)Cl$_3$ or P(O)Br$_3$, either neat or in aprotic solvent, to obtain the chloride or bromide, e.g., $CF_2=CF—R_f—(CH_2)_n—OP(O)(Cl_2)$, followed by hydrolysis to obtain the acid —OP(O)—(OH)$_2$. Specific conditions are disclosed in Monomer Preparations 1–2 below. Also see European Patent Application Publication 0 829 471 and PCT Patent Application Publication WO98/11114 with respect to preparation of these compounds.

When functionalized fluoropolymer is achieved by copolymerization, the amount of functional monomer in the functionalized fluoropolymer of this invention is small to achieve the desired concentration of functional groups, even when functionalized fluoropolymer is a blend comprising non-functional fluoropolymer. Generally, the amount of functional monomer is no more than 10 wt %, preferably no more than 5 wt %, based on total weight of functionalized fluoropolymer, i.e., the fluoropolymer component containing the functional monomer. In certain instances, higher concentrations of functional monomer exceeding 10 wt % may be desired, for example, to achieve good bonds to substrate metal such as stainless steel, or when it is not desired to use a non-functional monomer in the functionalized melt-fabricable fluoropolymer. While the functionalized fluoropolymer can be uniform, it is not necessary to have a uniform concentration of functional monomer throughout the functionalized fluoropolymer.

The fluoropolymer composition in the laminate of this invention is melt-fabricable. As such, the composition generally has melt viscosity (MV) in the range of $0.5–50\times10^3$ Pa·s though viscosities outside this range can be used. MV is measured according to ASTM D-1238 at the temperature appropriate for the predominant fluoropolymer component of the composition. Preferably, MV is in the range of $1–25\times10_3$ Pa·s. Usually, the MV of each fluoropolymer component is within the aforesaid ranges, but blending will permit a minor component to have MV in a wider range, as will be understood by one skilled in the art.

HTRP that can be used in this invention are chosen from melt-flowable heat-resistant organic polymers which are adhesion promoters and which have melting temperature, or glass transition temperature if amorphous, at least as high as the use temperature of the highest-melting fluoropolymer used as the major portion of the composition. Preferably, the HTRP exhibits melt flow at temperatures used for compounding and fabrication of the compositions, or fusing of powders or dispersions. Generally, HTRP are as defined by Koch in "High Temperature Resistant Thermoplastics-Products and General Properties " (Conference on High Temperature Thermoplastics, Ludwigshafen, 1993) and have continuous service temperatures of more than 140° C. Such thermoplastics that are adhesion promoters include, for example, polyaryletherketones; polyarylenesulfides; polysulfones including polyethersulfones, including aromatic polyethersulfones; polyimides including polyamideimides, polyesterimides, and polyetherimides; aromatic polyethers; and polyacrylonitrile. Preferred HTRP include polyetheretherketones (PEEK), polyetheretherketones (PEKK), polyphenylenesulfide (PPS), polyethersulfone (PES), and polyamideimides (PAI). Such polymers are known in the art. Representative HTRP used to illustrate the invention are listed in Table 2 below.

The melt-fabricable fluoropolymer compositions used to prepare laminates of this invention can have various forms. They can be melt-mixed compositions, compounded using melt processing equipment of conventional design and suitably equipped for handling fluoropolymers at melt temperatures, such as twin rotor mixers and extruders with good mixing capability. The compositions can also be powder blends, or dispersion or slurry blends.

The fluoropolymer composition can be processed by means, such as known in the art, appropriate to the physical form of the composition to form a laminate or to prepare the fluoropolymer component of a laminate. Thus, for example, the composition can be extruded or injection molded, or deposited by powder coating techniques such as rotolining or electrostatic spraying if the composition is a powder, or applied by wet coating techniques such as roll coating or spraying if the composition is a dispersion, followed by drying and fusing, and the like. Thus, the laminate of this invention can also be described as a coated article comprising a substrate (metal) coated with a coating, wherein the coating is a melt-fabricable fluoropolymer composition as herein described and is directly adhered to the metal substrate.

Laminates of this invention comprise melt-fabricable fluoropolymer composition as described above and metal. The laminate can consist of only two layers, one fluoropolymer and one metal, or can have two or more layers of fluoropolymer composition or of metal. If two or more layers of fluoropolymer composition or of metal are present, such layers need not be identical either in composition or thickness. As one skilled in the art will recognize, laminates of this invention can contain components that are neither metal nor melt-fabricable fluoropolymer composition containing functionalized fluoropolymer and HTRP adhesion promoter. Thus, for example, a laminate having one layer of metal and one layer of melt-fabricable fluoropolymer composition might also have one or more layers of fluoropolymer that is not melt-fabricable fluoropolymer composition as defined herein. In such an instance, for example, the melt-fabricable fluoropolymer composition might serve the function of a primer.

Laminates of this invention can be in many sizes and configurations. The metal component can be thick or thin, rigid or flexible, flat or contoured, and so on. E.g., the metal component (substrate) may be a rigid sheet, a flexible foil, or a structure such as a vessel (e.g., tank) or pipe, a cookware article, and the like. The melt-fabricable fluoropolymer composition component can be thick or thin, independently of the thickness of the metal component, and will, of course have the same general shape as the metal component. Generally, laminates will be rigid or flexible depending on the metal component, but a laminate having a flexible metal component and a thick fluoropolymer composition component may be less flexible than the metal alone. Thus, laminates may be rigid sheets, flexible strips that can be coiled, structures such as vessels (e.g., tanks) or pipes, cookware articles, and the like. As one skilled in the art will recognize, the thickness of the melt-fabricable fluoropolymer composition component of such laminates will vary with the purpose of the laminate and the function of the fluoropolymer composition component. For example, if the laminate is a chemical process vessel and the fluoropolymer composition is the sole coating, the fluoropolymer composition component may be relatively thick. On the other hand, if the fluoropolymer composition component is present as a primer along with additional fluoropolymer, then the fluoropolymer composition component may be relatively thin, such as when applied from an aqueous dispersion blend. Generally, the thickness of the melt-fabricable fluoropolymer composition component will be in the range of 0.01–5 mm, more commonly in the range of 0.02–3 mm.

The metal of the metal component of the laminate can be as appropriate to the intended use for the laminate. While aluminum is used for convenience in many of the examples below, other metals such as stainless or mild steel can be used. The metal surface can be rough or smooth. The Examples to follow illustrate the preference of the present invention for smooth metal surfaces. As known to those skilled in the art, the adhesion of coatings to metal can be enhanced by roughening the metal surface, e.g., by sandblasting. Generally, the metal surface should be free of dirt and grease.

As shown by the examples to follow, laminates of this invention exhibit good adhesion between the melt-fabricable fluoropolymer composition component and the metal component of the laminate. For laminates such that a peel test can be performed as hereinafter described, peel strength is generally at least 700 g/cm, preferably at least 1000 g/cm. Peel strength for a laminate of this invention is usually greater than the sum of peel strengths measured when either functional fluoropolymer or HTRP adhesion promoter is omitted from the composition.

EXAMPLES

Compositions were prepared for testing in laminates by melt compounding fluoropolymer resins and additives either in a laboratory twin-rotor mixer with roller type rotors (Rheomix® 3000, Haake Buechler) controlled and driven by Haake's Rheocord® 40 microprocessor controlled torque rheometer or in a 28-mm twin screw extruder (Werner & Pfleiderer). When using the twin-rotor mixer, all components were charged to the mixing chamber together. Temperature and rotor speed were controlled by adjustment within the microprocessor. The product removed from the mixer after melt blending was in relatively large chunks, which were cut into small pieces suitable for molding, or, in some cases, these small pieces were ground into a powder before molding. When using the extruder system, all components were combined in a plastic bag (or drum) and pre-blended by shaking and kneading (or tumble blending in a drum) before introducing the mixture into the feed hopper of the extruder. The extruder system yielded strands which were cut into pellets which were used directly to mold samples for performance testing. The amount of each component in the composition is expressed in wt % based on total combined weight of stated components.

Unless otherwise stated, TFE/PPVE copolymers containing a functional monomer were used in the following Examples to illustrate the invention. These functionalized fluoropolymers were prepared by aqueous dispersion polymerization generally by the method disclosed by Gresham & Vogelpohl (U.S. Pat. No. 3,635,926) using ethane as chain transfer agent (chloroform in one instance), except that a functional monomer was included in the initial charge to the reactor and buffer was not always used. Functional monomers employed are defined in Table 1. Functionalized fluoropolymer solids were isolated from the raw dispersion by mechanical shear coagulation and filtering, followed by drying. The compositions of functionalized fluoropolymers were determined by Fourier transform infrared spectroscopy.

opening was placed on the steel sheet. The chase was covered with an aluminum sheet 0.005 inch (0.13 mm) thick and 8 inches square as received from the manufacturer (A. J. Oster Co.), and a 2.5-inch (6.4-cm) wide strip of 0.002-inch (0.05-mm) thick polyimide film (Kaptone®, DuPont Co.) was positioned along one edge of the aluminum so that it overlapped the opening in the chase by about 0.5 inch (1.3 cm). Then, about 65 g of the test resin composition were placed on the aluminum foil within the outline of the opening in the chase. The resin was covered with another aluminum sheet, and in turn another steel plate. This construction was then compressed in a platen press at temperature and pressure appropriate to the fluoropolymer used. After removal from the press, the laminate was placed between heavy steel plates at room temperature until cool, and then was cut into one-inch (2.5-cm) wide strips.

The peel strength values reported herein were determined as follows. The layers of the laminate strips were separated at the polyimide parting film, and fastened in the jaws of an Instron® tensile tester. The moving jaw was driven at a

TABLE 1

Functional Monomer Identification

| Code | Identification or Description |
|---|---|
| EVE-OH | $CF_2=CF-[OCF_2CF(CF_3)]-O-CF_2CF_2-CH_2-OH$ |
| | 9,9-dihydro-9-hydroxy-perfluoro(3,6-dioxa-5-methyl-1-nonene) |
| EVE-P | $CF_2=CF-[OCF_2CF(CF_3)]-O-CF_2CF_2-CH_2-OP(O)(OH)_2$ |
| | 9-phosphono-9,9-dihydro-perfluoro(3,6-dioxa-5-methyl-1-nonene) |
| EVE—COOH | $CF_2=CF-[OCF_2CF(CF_3)]-O-CF_2CF_2-COOH$ |
| | 8-carboxyl-perfluoro(3,6-dioxa-5-methyl-1-octene) |
| EVE-carbamate | $CF_2=CF-[OCF_2CF(CF_3)]-O-CF_2CF_2-CH_2-O-(CO)-NH_2$ |
| | 9-carbamate-9,9-dihydro-perfluoro(3,6-dioxa-5-methyl-1-nonene) |
| PDMOF | $CF_2=CF-[OCF_2CF(CF_3)]-O-CF_2CF_2-SO_2F$ |
| | 8-fluorosulfonyl-perfluoro(3,6-dioxa-5-methyl-1-octene) |

Unless otherwise stated, compositions prepared in the following Examples included a non-functional TFE/PPVE copolymer (PFA) which was used in cube form as supplied (Teflon® PFA fluoropolymer resin grade 340, DuPont). The peel strength measured against aluminum, as described below, for this resin alone was in the range of 185–345 g/cm.

HTRP adhesion promoters employed are defined in Table 2. All HTRP were obtained as granules or finely divided powders and were used as such.

TABLE 2

HTRP Identification

| Code | Name | Identification or Reference |
|---|---|---|
| PEEK | Polyetheretherketone | Victrex ® grade 380, ICI Ltd. |
| PPS | Polyphenylenesulfide | Ryton ® grade V1, Phillips Petroleum |
| PES | Polyethersulfone | Victrex ® grade 3600P, ICI Ltd. |
| PEKK | Polyetherketoneketone | Gay et al., U.S. Pat. No. 4,816,556 |
| PAI | Polyamideimide | Torlon ® grade 4203L, Amoco |

Unless otherwise stated, melt flow rate (MFR) was measured at 372° C. by the method of ASTM D-1238 modified as described in U.S. Pat. No. 4,380,618. For such MFR measurement, MFR is related to melt viscosity (MV) by the relationship MV=53.15/MFR, when MFR is in units of g/10 min and MV is in units of $10_3$ Pa·s.

Unless otherwise stated, samples were prepared for peel strength testing as follows. A steel plate 0.060-inch (1.5-mm) thick and 8-inch (20.3-cm) square was used as the base for the laminate fabrication. A 0.040-inch (1.0-mm) thick and 8-inch square chase having a 6-inch (15.2-cm) square speed of 1 or 2 inch/min (2.5 or 5.1 cm/min) to peel the layers apart, with the free end of the laminate taking on an angle of 180° with respect to the line of the jaws during the pull. The average force to peel the strips apart during the time interval between 30 sec and 100 sec of pulling was recorded, and is reported in force per unit width of strip.

Examples 1–5 and Controls

These Examples illustrate the present invention for laminates based on fluoropolymer compositions containing several types of HTRP. The functional monomer employed in the functionalized fluoropolymer was EVE-OH (Table 1). Three functionalized fluoropolymers, prepared as described above, containing EVE-OH were employed. Fcn-FP-1 contained 3.1 wt % of PPVE and 7.3 wt % of EVE-OH, and had MV too high to measure. Fcn-FP-2 contained 3.6 wt % of PPVE and 3.1 wt % of EVE-OH, and had MV of 6.8×10³ Pa.s. Fcn-FP-3 contained 4.5 wt % of PPVE and 1.6 wt % of EVE-OH, and had MV of 3.3×10³ Pa·s. Compositions (wt %) shown in Table 3 were prepared using either the extruder or the twin-rotor mixer as the compounding device, indicated in Table 3 by E or M, respectively. For each composition, peel strength against aluminum was measured as described above. The results, also given in Table 3, show surprisingly higher adhesion when functionalized fluoropolymer and HTRP are both present in the fluoropolymer composition component of the laminate. For example, the peel strength exhibited in Example 2 was more than 300% of the sum of the peel strengths when only functionalized fluoropolymer or HTRP was present in the fluoropolymer composition.

TABLE 3

Compositions and Results for Examples 1–5 and Controls

| | Example/Control | | | | | | | | | | | | |
|---|---|---|---|---|---|---|---|---|---|---|---|---|---|
| | A | B | 1 | C | D | 2 | E | 3 | F | 4 | G | H | 5 |
| Composition (wt %): | | | | | | | | | | | | | |
| Fcn-FP-1 | 10 | — | 10 | — | — | — | — | — | — | — | — | — | — |
| Fcn-FP-2 | — | — | — | 10 | — | 10 | — | 10 | — | 10 | — | — | — |
| Fcn-FP-3 | — | — | — | — | — | — | — | — | — | — | 10 | — | 10 |
| PPS | — | 3 | 3 | — | — | — | — | — | — | — | — | — | — |
| PES | — | — | — | — | 3 | 3 | — | — | — | — | — | — | — |
| PEKK | — | — | — | — | — | — | 3 | 3 | — | — | — | — | — |
| PEEK | — | — | — | — | — | — | — | — | 3 | 3 | — | — | — |
| PAI | — | — | — | — | — | — | — | — | — | — | — | 3 | 3 |
| PFA | 90 | 97 | 87 | 90 | 97 | 87 | 97 | 87 | 97 | 87 | 90 | 97 | 87 |
| Device | M | M | E | E | E | E | E | E | E | E | E | M | M |
| Properties: | | | | | | | | | | | | | |
| MV ($10^3$ Pa · s) | 6.8 | 4.1 | 4.6 | 3.9 | 4.3 | 3.8 | 3.7 | 4.1 | 3.8* | 3.9 | 3.6 | 4.4 | 10.1 |
| Peel strength (g/cm) | 0 | 138 | 2056 | 135 | 433 | 1780 | 468 | 1504 | 386* | 2104 | 0 | 703 | 1198 |

*Average of two preparations of Composition F.

Examples 6–9 and Controls

These Examples illustrate the present invention for different proportions of functionalized fluoropolymer and HTRP. The functionalized fluoropolymer was Fcn-FP-3 (Examples 1–5). Compositions and results are shown in Table 4. All compositions were prepared in the extruder, except for Control J which was prepared in the twin-rotor mixer. As shown by the data in Table 4, adhesion was high for all of the compositions containing both the functionalized fluoropolymer and the HTRP.

TABLE 4

Compositions and Results for Examples 6–9

| | Example/Control | | | | | | |
|---|---|---|---|---|---|---|---|
| | I | J | K | 6 | 7 | 8 | 9 |
| Composition (wt %): | | | | | | | |
| Fcn-FP-3 | 2.5 | 10.0 | — | 2.5 | 2.5 | 10.0 | 20.0 |
| PEEK | — | — | 2.0 | 0.5 | 4.0 | 2.0 | 4.0 |
| PFA | 97.5 | 90.0 | 98.0 | 97.0 | 93.5 | 88.0 | 76.0 |
| Properties: | | | | | | | |
| MV ($10^3$ Pa · s) | 3.5 | 4.6 | 3.9 | 3.8 | 3.8 | 4.2 | 4.1 |
| Peel strength (g/cm) | 264 | 217 | 290 | 1532 | 1998 | 2121 | 2840 |

Examples 10–11 and Controls

These examples illustrate the present invention for a functionalized fluoropolymer containing a different functional monomer (EVE-COOH). The functionalized fluoropolymer (Fcn-FP-4) contained 4.5 wt % of PPVE and 1.0 wt % of EVE-COOH, and had MV of $0.2 \times 10^3$ Pa·s. Compositions and results are shown in Table 5. As shown by the data, adhesion was high for the compositions containing both the functionalized fluoropolymer and the HTRP.

TABLE 5

Compositions and Results for Examples 10–11

| | Example/Control | | | | | |
|---|---|---|---|---|---|---|
| | L | M | N | O | 10 | 11 |
| Composition (wt %): | | | | | | |
| Fcn-FP-4 | 20 | 25 | — | — | 20 | 25 |
| PEEK | — | — | 3 | 5 | 3 | 5 |
| PFA | 80 | 75 | 97 | 95 | 77 | 70 |
| Device | E | M | E | M | E | M |
| Properties: | | | | | | |
| MV ($10^3$ Pa · s) | 2.9 | 2.4 | 3.9 | 4.3 | 2.9 | 2.7 |
| Peel strength (g/cm) | 562 | 220 | 507 | 620 | 908 | 1380 |

Monomer Preparation 1

$CF_2$=CFO—$CF_2CF(CF_3)$O—$CF_2CF_2$—$CH_2$—OP(O)—$Cl_2$

A pre-dried flask was charged with EVE-OH (257 g, 0.652 mol), phosphoryl chloride (500 g, 3.257 mol) and anhydorus calcium chloride (3.6 g, 0.0324 mol). This reaction mixture was heated at 110° C. for 6–8 hr or until the EVE-OH string material was consumed. The excess phosphoryl chloride was recovered by distillation at normal pressure. The residual liquid was then distilled under reduced pressure to give 9-phosphonochloride-9,9-dihydro-perfluoro(3,6-dioxa-5-methyl-1-nonene) (EVE-P-chloride, formula above) product as a clear, colorless liquid having a boiling point of 85°–90° C. at 5 mmHg (or 67°–72° C. at 2 mmHg). Yield: 200 g (60%).

Monomer Preparation 2

$CF_2$=CFO—$CF_2CF(CF_3)$O—$CF_2CF_2$—$CH_2$—OP(O)—$(OH)_2$

A round bottom flask was charged with 700 g (1.37 mol) of EVE-P-chloride and water (49.4 g, 2.75 mol) was slowly added. After all the water was added, the reaction mixture was stirred vigorously at ambient temperature overnight, then placed under high vacuum at 60° C. to remove any residual water and to give 9-phosphono9,9-dihydro-perfluoro(3,6-dioxa-5-methyl-1-nonene) (EVE-P, formula above) product as a clear, viscous liquid (640 g, 98.6% yield).

Example 12

This example illustrates the present invention for a functionalized fluoropolymer containig a different flinctional monomer (EVE-P). The functionalized fluoropolymr (Fcn-FP-5) contained 4.1 wt % of PPVE and 0.8 wt % of EVE-P, and had MV of $0.7 \times 10^3$ Pa·s. All compositions were prepared in the twin-rotor mixer. Compositions and results are shown in Table 6. As shown by the data, adhesion was high for the composition containing both the functionalized fluoropolymer and the HTRP.

TABLE 6

Compositions and Results for Example 12

| Example/Control | P | Q | 12 |
|---|---|---|---|
| Composition (wt %): | | | |
| Fcn-FP-5 | 10 | — | 10 |
| PEEK | — | 3 | 3 |
| PFA | 90 | 97 | 87 |
| Properties: | | | |
| MV ($10^3$ Pa · s) | 3.4 | 2.8 | 3.5 |
| Peel strength (g/cm) | 0 | 211 | 1086 |

Examples 13–14 and Controls

These examples illustrate the present invention for laminates based on fluoropolymer compositions containing non-functional fluoropolymer other than PFA. The non-functional fluoropolymers were a TFE/HFP copolymer (FEP) satisfying ASTM D-2116 Type I (Teflon® FEP fluoropolymer resin grade 100, DuPont) and a TFE/ethylene copolymer (ETFE) modified with perfluorobutyl ethylene (Tefzel® ETFE fluoropolymer grade 200, DuPont). The functionalized fluoropolymer was Fcn-FP-2 (Examples 1–5) or Fcn-FP-6 which contained 4.3 wt % of PPVE and 1.6 wt % of EVE-OH, and had MV of $0.7 \times 10^3$ Pa·s. The HTRP was PPS or PEEK. All compositions were prepared in the twin-rotor mixer. Compositions and results are shown in Table 7. MV for Example 14 and Controls T and U was determined by a method similar to that described above, but at 290° C. and using 36.0 (instead of 53.15) as the conversion factor. As shown by the data, adhesion was high for the compositions containing both the functionalized fluoropolymer and the HTRP, showing that different fluoropolymers can be used in compositions of the invention and the functional fluoropolymer need not be the same type as non-functional fluoropolymer, if the composition contains non-functional fluoropolymer.

TABLE 7

Compositions and Results for Examples 13–14

| | Example/Control | | | | | |
|---|---|---|---|---|---|---|
| | R | S | 13 | T | U | 14 |
| Composition (wt %): | | | | | | |
| Fcn-FP-2 | 10 | — | 10 | — | — | — |
| Fcn-FP-6 | — | — | — | 10 | — | 10 |
| PPS | — | 3 | 3 | — | — | — |
| PEEK | — | — | — | — | 3 | 3 |
| FEP | 90 | 97 | 87 | — | — | — |
| ETFE | — | — | — | 90 | 97 | 87 |
| Properties: | | | | | | |
| MV ($10^3$ Pa · s) | 7.2 | 6.8 | 6.2 | 4.6 | 5.1 | 2.5 |
| Peel strength (g/cm) | 122 | 56 | 1720 | 411 | 1300 | 1698 |

Example 15 and Controls

This example illustrates the present invention for laminates based on a fluoropolymer composition containing a non-functional fluoropolymer (PFA-1) that has been chemically modified to enhance purity and improve thermal stability (Teflon® PFA fluoropolymer resin grade 440 HP, DuPont). The functionalized fluoropolymer (Fcn-FP-7) contained 3.5 wt % of PPVE and 6.2 wt % of EVE-OH, 10 and had MV of $28 \times 10^3$ Pa–s. The compositions were prepared in the extruder. Compositions and results are shown in Table 8. As shown by the data, adhesion was high for the composition containing both the functionalized fluoropolymer and the HTRP.

TABLE 8

Compositions and Results for Example 15

| Example/Control | V | W | 15 |
|---|---|---|---|
| Composition (wt %): | | | |
| Fcn-FP-7 | — | 10.3 | 10.1 |
| PEEK | — | — | 1.7 |
| PFA-1 | 100.0 | 89.7 | 88.2 |
| Device | — | E | E |
| Properties: | | | |
| MV ($10^3$ Pa · s) | — | 4.1 | 4.2 |
| Peel strength (g/cm) | 0 | 0 | 1977 |

Example 16 and Controls

This example illustrates the present invention for a functionalized fluoropolymer composition containing graphite. The functionalized fluoropolymer (Fcn-FP-8) contained 3.7 wt % of PPVE and 6.5 wt % of EVE-OH, and had MV of $1.3 \times 10^3$ Pa·s. The non-functional fluoropolymer (PFA-2) in this instance was a different TFE/PPVE copolymer used in cube form as supplied (Teflon® PFA fluoropolymer resin grade 345, DuPont). All compositions were prepared in the twin-rotor mixer. Compositions and results are shown in Table 9. Peel strength was high for the composition containing both the functionalized fluoropolymer and the HTRP, showing that the laminate of this invention can be prepared from fluoropolymer compositions containing inert filler.

TABLE 9

Compositions and Results for Example 16

| Example/Control | X | Y | Z | 16 |
|---|---|---|---|---|
| Composition (wt %): | | | | |
| Fcn-FP-8 | — | 16 | — | 16 |
| PEEK | — | — | 3 | 3 |
| PFA-2 | 80 | 64 | 77 | 59 |
| Graphite | 20 | 20 | 20 | 22 |
| Properties: | | | | |
| MV ($10^3$ Pa · s) | 29 | 195 | 31 | 52 |
| Peel strength (g/cm) | 143 | 180 | 196 | 1965 |

Examples 17–18 and Controls

This example illustrates the present invention for laminates using type 321 stainless steel foil 0.002 inch (0.051 mm) thick (PTP-512, Lyon Industries) instead of aluminum as the metal component. The foil was clean as received from the manufacturer and was used as received. Compositions and results are shown in Table 10. Fcn-FP-9 was a TFE copolymer containing 10.6 wt % of EVE-OH and no PPVE, and having MV of $1.7 \times 10^3$ Pad·s. I.e., the concentration of functional monomer was high enough that non-functional comonomer could be omitted from Fcn-9. As shown by the data, adhesion was high for the compositions containing both functionalized fluoropolymer, which had relatively high concentration of functional monomer, and HTRP.

TABLE 10

Compositions and Results for Examples 17–18

|  | Example/Control | | | | | |
|---|---|---|---|---|---|---|
|  | AA | BB | 17 | CC | DD | 18 |
| Composition (wt %): | | | | | | |
| Fcn-FP-7 | 10 | — | 10 | — | — | — |
| Fcn-FP-9 | — | — | — | 10 | — | 10 |
| PEEK | — | 2 | 2 | — | 4 | 4 |
| PFA | — | — | — | 90 | 96 | 86 |
| PFA-1 | 90 | 97 | 88 | — | — | — |
| Device | E | M | E | M | M | M |
| Properties: | | | | | | |
| MV ($10^3$ Pa · s) | 4.1 | — | 4.2 | 3.1 | — | 8.1 |
| Peel strength (g/cm) | 124 | 90 | 1092 | 322 | 375 | 1787 |

Example 19 and Controls

This example illustrates the present invention for laminates using mild steel foil 0.003 inch (0.076 mm) thick instead of aluminum as the metal component. This foil was low-carbon shim stock (QQ-S-698) from Lyon Industries. A lubricant or protective oil on the surface of the foil as-received was removed with acetone prior to use. All compositions were prepared in the twin-rotor mixer. Compositions and results are shown in Table 11. Adhesion was high for the composition contaig both functionalized fluoropolymer and HTRP.

TABLE 11

Compositions and Results for Examples 19

| Example/Control | EE | FF | 19 |
|---|---|---|---|
| Composition (wt %): | | | |
| Fcn-FP-9 | 10 | — | 10 |
| PEEK | — | 3 | 3 |
| PFA | 90 | 97 | 87 |
| Properties: | | | |
| MV ($10^3$ Pa · s) | 3.1 | — | 8.1 |
| Peel strength (g/cm) | 45 | 241 | 1690 |

Examples 20–21 and Controls

These examples illustrate the present invention for functionalized fluoropolymers contaning different functional monomers (EVE-carbamate and PDMOF) and containing PEVE instead of PPVE. The functionalized fluoropolymer Fcn-FP-10 contained 6.7 wt % of PEVE and 1.1 wt % of EVE-carbamate, and had MV of $1.6 \times 10^3$ Pa·s. The functionalized fluoropolymer Fcn-FP-11 contained 14.9 wt % of PEVE and 2.0 wt % of PDMOF, and had MV of $0.1 \times 10^3$ Pa·s. All compositions were prepared in the twin-rotor mixer. Compositions and results are shown in Table 12. As shown by the data, adhesion was high for the compositions containing both the functionalized fluoropolymer and the HTRP.

TABLE 12

Compositions and Results for Examples 20–21

|  | Example/Control | | | | | |
|---|---|---|---|---|---|---|
|  | GG | HH | 20 | II | JJ | 21 |
| Composition (wt %): | | | | | | |
| Fcn-FP-10 | 2.5 | — | 2.5 | — | — | — |
| Fcn-FP-11 | — | — | — | 2.5 | — | 2.5 |
| PEEK | — | 4.0 | 4.0 | — | 4.0 | 4.0 |
| PFA | 97.5 | 96.0 | 93.5 | 97.5 | 96.0 | 93.5 |
| Properties: | | | | | | |
| MV ($10^3$ Pa · s) | 4.2 | 4.3 | 3.5 | 4.0 | 4.3 | 3.6 |
| Peel strength (g/cm) | 268 | 518 | 2514 | 13 | 518 | 1070 |

What is claimed is:

1. A laminate, comprising metal, and melt-fabricable fluoropolymer composition adhered thereto, said composition comprising functionalized fluoropolymer resin, melt-fabricable non-functionalized fluoropolymer resin, and high temperature resistant thermoplastic resin adhesion promoter, said high temperature resistant thermoplastic resin adhesion promoter being present in the amount of 0.5–10 wt % based on the combined weights of high temperature resistant thermoplastic resin adhesion promoter and total fluoropolymer resin present, said functionalized fluoropolymer resin being present in the amount of 1–30 wt % based on said combined weights.

2. The laminate of claim 1, wherein said composition also comprises inert filler.

3. The laminate of claim 1, wherein the functional group of said functionalized fluoropolymer is at least one of —$SO_2F$ and —$CH_2$—Z wherein —Z is —OH, —O—(CO)—$NH_2$, or —OP(O)(OH)$_2$.

4. The laminate of claim 3, wherein said functional group is —$CH_2$—OH.

5. The laminate of claim 1, wherein said laminate is rigid.

6. The laminate of claim 1, wherein said laminate is flexible.

7. The laminate of claim 1, having a peel strength between the metal component and the melt-fabricable fluoropolymer composition of at least 700 g/cm.

8. The laminate of claim 1 wherein the amount of said non-functionalized fluoropolymer resin is 2.5–25 wt % based on said combined weights.

9. A laminate, comprising metal and melt-fabricable fluoropolymer composition adhered thereto, said composition comprising functionalized fluoropolymer resin and high temperature resistant thermoplastic resin adhesion promoter, said high temperature resistant thermoplastic resin adhesion promoter being present in the amount of 0.5–10 wt % based on the combined weights of high temperature resistant thermoplastic resin adhesion promoter and total fluoropolymer resin present wherein the functional group of said functionalized fluoropolymer resin is —$CH_2$—OP(O)(OH)$_2$.

10. A laminate, comprising metal and melt-fabricable fluoropolymer composition adhered thereto, said composition comprising functionalized fluoropolymer resin and high temperature resistant thermoplastic resin adhesion promoter, said high temperature resistant thermoplastic resin adhesion promoter being present in the amount of 0.5–10 wt % based on the combined weights of high temperature resistant thermoplastic resin adhesion promoter and total fluoropolymer resin present, wherein the functional group of said functionalized fluoropolymer resin is —$CH_2$—O—(CO)—$NH_2$.

* * * * *